Patented June 20, 1933

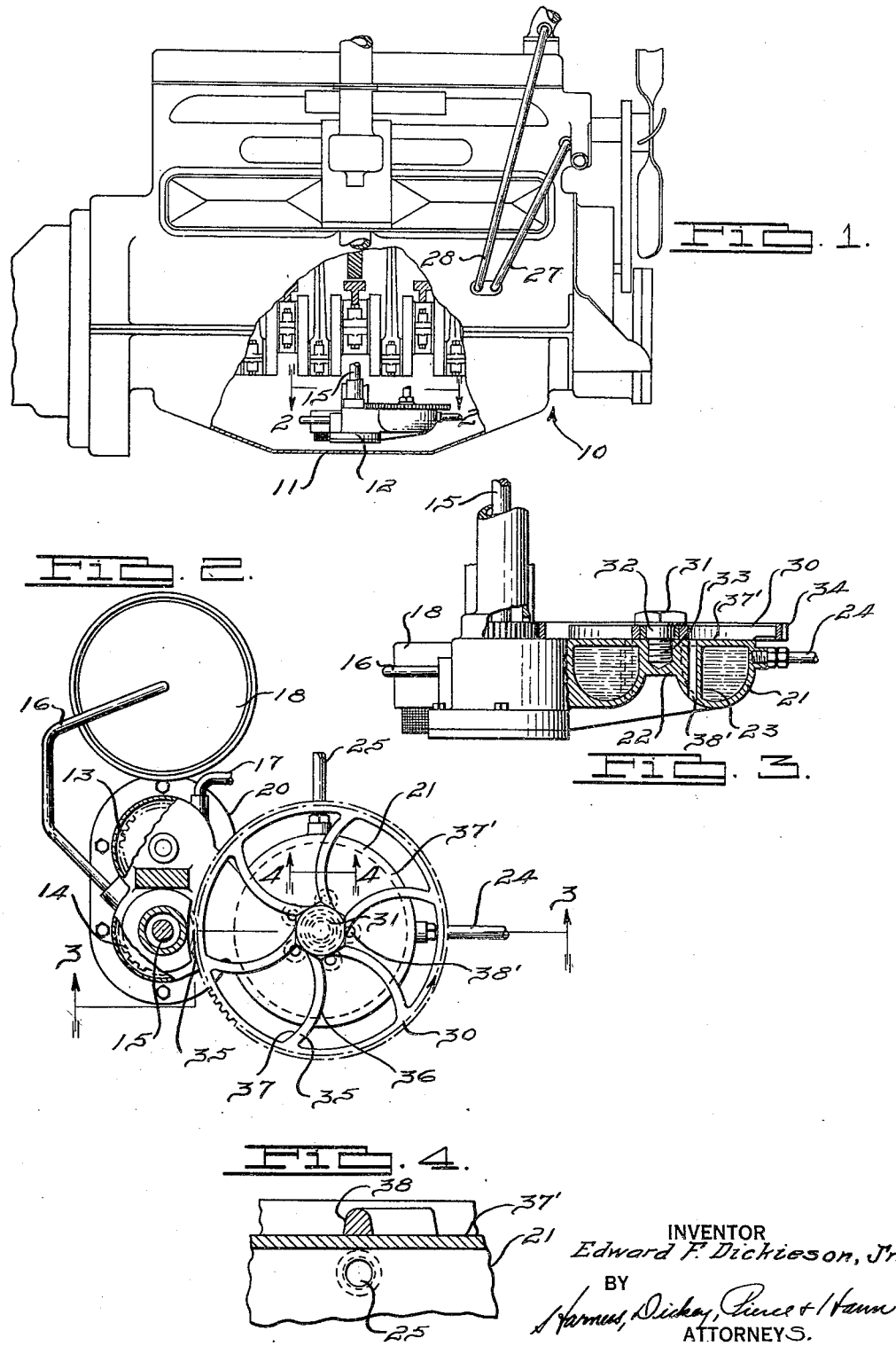

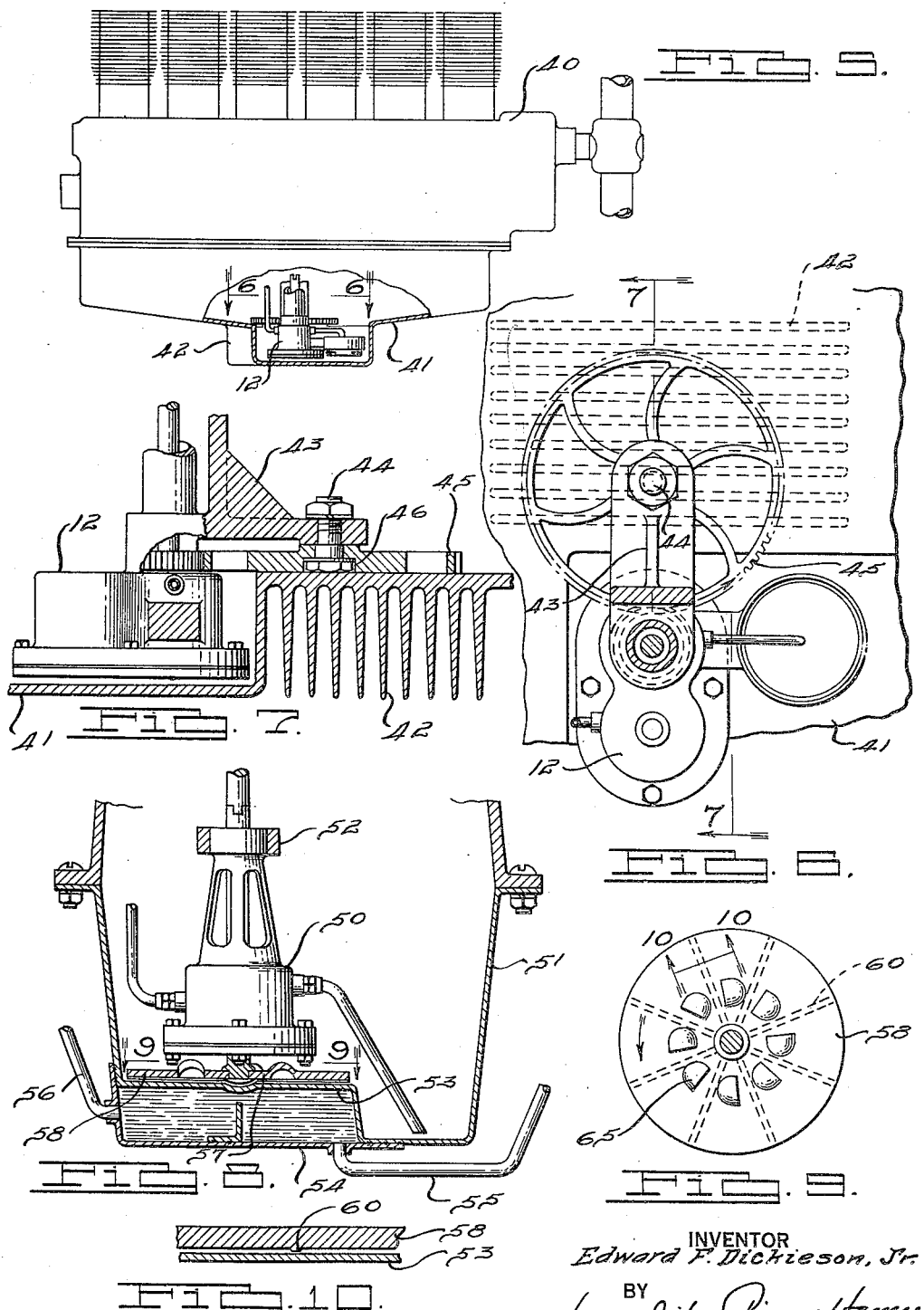

1,914,662

UNITED STATES PATENT OFFICE

EDWARD F. DICKIESON, JR., OF DETROIT, MICHIGAN, ASSIGNOR TO GEORGE H. HUNT, OF DETROIT, MICHIGAN

MEANS FOR CONTROLLING TEMPERATURE OF LUBRICANTS

Application filed July 31, 1931. Serial No. 554,233.

The invention relates generally to lubricating systems for motors and the like, and it has particular relation to a mechanism for controlling the temperature of the lubricant.

The principal objects of the invention are to provide a temperature governing arrangement in a lubricating system or the like, which will maintain the lubricant at a proper temperature and increase its efficiency of operation; to provide an arrangement of this character which is simple in construction and operation, and capable of lasting indefinitely without becoming defective; to provide a mechanism by means of which an efficient flow of heat to or from the lubricant will be secured and the temperature of the entire body of the lubricant maintained in a proper manner; to provide an arrangement of the above designated character, which can be used efficiently either in conjunction with air cooled motors or motors of the water cooled type, and to provide a method of efficiently controlling the temperature of the lubricant.

For a complete understanding of the invention reference may be had to the accompanying drawings forming a part of the specification, wherein:

Figure 1 is a side view of a motor for a motor vehicle, with parts broken away for the purpose of clarity, illustrating a mechanism which is constructed according to one form of the invention;

Fig. 2 is a cross-sectional view on a larger scale, taken substantially along line 2—2 of Fig. 1;

Fig. 3 is a cross-sectional view, taken substantially along line 3—3 of Fig. 2;

Fig. 4 is a cross-sectional view on a larger scale, taken substantially along line 4—4 of Fig. 2;

Fig. 5 is a side view of a motor of the air cooled type having mechanism constructed according to one form of the invention, associated therewith;

Fig. 6 is a cross-sectional view on a larger scale, taken substantially along line 6—6 of Fig. 5;

Fig. 7 is a cross-sectional view, taken substantially along line 7—7 of Fig. 6;

Fig. 8 illustrates a lubricant temperature controlling mechanism constructed according to a different form of the invention;

Fig. 9 is a cross-sectional view, taken substantially along line 9—9 of Fig. 8;

Fig. 10 is a cross-sectional view on a larger scale, taken substantially along line 10—10 of Fig. 9.

Referring to Fig. 1, a motor is illustrated at 10 which may be of any conventional construction. A motor of this character ordinarily has an oil pan 11 adapted to receive and retain oil used for lubricating moving parts, and, at the present time, a motor of this type ordinarily is provided with an oil pump indicated at 12 for circulating the oil under pressure to such moving parts that require oil. The form of pump illustrated, as shown best by Fig. 2, comprises intermeshing gears 13 and 14 which are driven by means of a shaft 15 rigidly connected to gear 14 for example, and which in turn is driven by operative connection to a rotary part of the motor. This pump has the usual inlet and outlet pipes 16 and 17, and a strainer 18 associated with the pipe 16 for preventing foreign substances from getting into the lubricating system.

At one side, the pump casing indicated at 20 has a laterally projecting, hollow casing part 21 which as best shown by Fig. 2, is substantially circular in shape. As seen in Fig. 3, the part 21 has a centrally located solid portion 22 and an annular space 23 extending around the solid portion. The space 23 is adapted to receive circulating water from the water circulating system of the motor, and to convey water to and from this space, conduits 24 and 25 are provided which communicate with the space and respectively with conduits 27 and 28 shown by Fig. 1, communicating with the water circulating system. By means of this arrangement, a flow of water through the space 23 is effected while the motor is operating. At this time it is desired to call attention to the fact that the temperature of such water ordinarily is not more than 175 degrees Fahrenheit and hence the water is relatively cool as compared to the usual temperature of the lubricating oil which frequently has a temperature of 300 degrees Fahrenheit or more.

A relatively large pinion 30 is journaled on the casing part 21 by means of a bolt 31 having a cylindrical bearing portion 32 journaled in a central portion of the pinion, and a threaded portion 33 threaded into the solid portion 22 of the casing. This pinion has teeth 34 on its outer periphery, which mesh with, as best shown by Fig. 2, a pinion 35 on the shaft 15 of the pump mechanism, located above the gear 14 and upon that part of the pump casing, housing the latter pinion. The pinion 30 is open from its periphery to its center, with the exception of spokes 35 interconnecting these parts of the pinion, and such spokes are directed arcuately thereby providing a convex side edge 36 and a concave side edge 37. The upper surface of the casing 21, indicated at 37' lies in a horizontal plane and normally is submerged in the oil in oil pan 11. As best shown by Fig. 4, each of the spokes 35 has its convex side edge slightly inclined to the vertical as indicated at 38 while the lower surface of the spoke lies in a horizontal plane substantially in contact with the upper surface of the casing 21.

For securing an added cooling effect, the casing part 21 has vertical apertures 38' arranged in spaced circumferential relation around the solid portion 22 and oil flowing through such apertures contacts with walls around said openings which are cooled by the water. Such openings will constantly be filled with oil which will be cooled by the water.

When the pump is operating, the pinion 30 will be rotated in the direction indicated by the arrow thereon in Fig. 2, and when so rotated the convex side edge 36 of the spoke will be ahead of the concave side. It is apparent that the lower forward edge of each spoke will scrape the oil from the upper surface 37' of casing 21, and owing to the convex formation of the forward side edge of each spoke, such oil scraped away will be moved toward the outer periphery of the casing and finally be forced away from such surface. Oil above the oil thus scraped away immediately will occupy the space from which the latter oil has been removed and in turn such oil will be scraped away by the succeeding spokes. In view of the fact that the upper surface 37' of casing 21 defines the upper wall of the water space 23, the heat from the oil thereon will be rapidly conducted through such wall, and absorbed by the relatively cool water in the space 23. The circulating water 23 constantly tends to maintain the surface 37' contacting with the oil, at the temperature of the water and since this temperature is much lower than the oil in the pan 11, heat from the oil will rapidly flow through such wall and be absorbed by the water. If a layer of oil were allowed to remain on the upper surface 37' of the casing 21, it would become relatively cool because the heat therein would be absorbed by the water, but such layer would tend to stick to the surface and would interfere with the flow of heat from the remaining oil through the upper wall of the casing and to the water. The scraping means or spokes 38 constantly remove by scraping action, this layer of relatively cool oil and force it into the remaining body of oil and as a result of this operation, cool oil is repeatedly being scraped away from the upper surface of the casing by the spokes and oil of relatively high temperature is deposited on such surface. A more uniform flow of heat is effected in this manner, from the oil to the water and it is therefore possible to maintain the temperature of the oil at a much lower temperature which is highly desirable.

The arrangement shown by Figs. 5, 6 and 7 is similar to that previously described except that the cooling mechanism is adapted for an air cooled engine indicated at 40 in Fig. 5. In this construction the oil pan is indicated at 41 and as best shown by Fig. 7 at one point the pan is provided with heat radiating fins 42. The oil pump in this construction is substantially identical to that previously described and is indicated by the same numeral 12. The pump casing is provided with a laterally offset bracket portion 43 which at its outer end is provided with a bolt 44 on the lower end of which a pinion 45 is provided which is substantially identical to the pinion 30 shown in the previous figures. It will be noted that the lower end of the bolt 44 seats in a recess 46 in the lower side of the groove and is substantially in contact with the inner surface of the oil pan part adjacent the fins 42. The lower side of pinion 45 substantially contacts with the upper surface of the oil pan portion having the fins 42 and as in the previous construction, the pinion is provided with scraping spokes adapted to scrape the oil from the upper surface of the oil pan. It is apparent that relatively cool oil, cooled by the rapid dissipation of heat from the fins 42 outwardly of the oil pan, will be scraped away and replaced by relatively warm oil and this operation repeatedly is performed and the temperature of the oil uniformly reduced as a result thereof.

In the construction shown by Fig. 8, the oil pump is indicated at 50 and is held in a suspended position in the oil pan indicated at 100

51 by means of a bracket 52. The lower part of the oil pan 51 is provided with an inset portion 53 to provide a recess at the bottom part of the pan, and this recess is normally closed by means of a cover plate 54. The receptacle thus formed is adapted to receive water which is conducted through the receptacle by means of inlet and outlet pipes 55 and 56 which are in turn connected to the water circulating system of the motor. One shaft of the oil pump 50 projects downwardly below the pump casing as indicated at 57 and is rigidly secured to a disc indicated at 58. The lower surface of this disc, as indicated by Figs. 9 and 10, is provided with radial teeth 60 having side edges slightly inclined to the vertical. While the teeth 60 are shown as directed radially, it is of course apparent that they may be directed arcuately to present forwardly directed convex edges as shown in the previous construction in connection with the scraping pinion. The teeth substantially contact with the upper substantially horizontal wall of the oil pan defining the inset 53 and are adapted to scrape the oil away from the upper surface of such wall. It will be apparent that the constantly circulating water in the receptacle will rapidly absorb heat from the oil on the upper surface of the wall substantially contacting with the teeth 60 of the disc and since this relatively cool oil is constantly being scraped away and heated oil deposited in its place, heat from the body of the oil will be uniformly absorbed by the water and the body of the oil uniformly reduced in temperature. For facilitating the depositing of oil below the disc 58, the disc is provided with upwardly pressed cup-shaped portions 65 having forwardly directed openings which draw the oil from above the disc down into the space below the disc. It will be apparent from this description that the relatively cool oil below the disc will be continually scraped away and other oil above the disc deposited in its place thereby securing what might be termed a circulation of oil between the disc and the oil pan wall below the disc, during which time the oil cooled by engagement with such wall will be constantly removed by the disc 60 scraping it away from the upper surface of the wall.

From the previous description it should be apparent that a mechanism is thus provided by means of which oil is uniformly cooled and its temperature substantially reduced in a highly efficient manner. The relatively low temperature of the water will rapidly absorb heat from the oil, because as the oil is cooled by engagement with the oil pan wall defining the water receptacle, it is immediately scraped away allowing the warmer oil to be deposited on the relatively cool surface of the oil pan wall. The teeth 60 on disc 58, and the spokes 30 on the pinion, will substantially contact with the water receptacle wall and remove practically all of the oil previously on the surface of such wall, thereby presenting a relatively cool metallic surface which will rapidly absorb the heat from the freshly deposited oil on the surface. The mechanism described is extremely advantageous because its operation will maintain the temperature of the oil at a much lower degree than usual and as a consequence the oil will last much longer and will serve more efficiently as a lubricant.

It is to be understood that mechanism constructed according to the invention may be used for warming the lubricant as well as cooling it, and at times in winter, very probably heat will be transmitted to the oil. In any event, the mechanism provides an efficient and rapid means for causing an exchange of heat between the oil and medium having a temperature different therefrom. It is to be understood also that the mechanism may be used in various situations where it is desired to govern the temperature of a lubricant, or the like, and need not be limited to use in a motor.

Although several forms of the invention have been described and illustrated in detail, it should be apparent to those skilled in the art that various modifications may be made without departing from the scope of the appended claims.

I claim:

1. In combination, a member having an oil engaging surface, said surface having a temperature different as compared to the temperature of oil, and means for scraping the oil away from said surface and allowing other oil to be deposited in contact therewith in order to modify the temperature thereof.

2. In combination, a member having an oil engaging surface, which is exposed to a medium having a temperature different as compared to the temperature of the oil, for affecting the temperature of said surface, and mechanically operated means for positively engaging and repeatedly removing the layer of oil on said surface and allowing other oil to be deposited in place thereof.

3. In combination, a member having an oil engaging surface, which is exposed to a medium having a different temperature as compared to the temperature of the oil, for affecting the temperature of said surface, and means for repeatedly scraping the layer of oil on said surface away from such surface, and allowing other oil to be deposited in place thereof.

4. In combination, an oil receptacle for a motor, said receptacle having an oil engaging surface therein, which is exposed to a medium having a different temperature as compared to the temperature of the oil, for affecting the temperature of said surface, and means for scraping the oil from said surface and allowing other oil to be deposited in place thereof.

5. In combination, an oil receptacle, said receptacle having an oil engaging surface therein, which is exposed to a medium having a different temperature as compared to the temperature of the oil, for affecting the temperature of said surface, and driven means for repeatedly removing the layer of oil on said surface and allowing other oil to be deposited in place thereof, said means including a scraping element disposed closely adjacent to said surface.

6. In combination, an oil receptacle, said receptacle having an oil engaging surface therein, which is exposed to a medium having a different temperature as compared to the temperature of the oil, for affecting the temperature of said surface, and a driven element for repeatedly removing the layer of oil on said surface and allowing other oil to be deposited in place thereof, said element having means substantially contacting with said surface and adapted to scrape the oil therefrom.

7. In combination, an oil receptacle for a motor, said receptacle having an oil engaging surface therein, which is exposed to a medium having a different temperature as compared to the oil temperature, for affecting the temperature of the surface, and a rotary element for repeatedly removing the layer of oil on said surface and allowing other oil to be deposited in place thereof, said rotary element having a scraping edge substantially contacting with said surface.

8. In combination, a member having an oil engaging surface therein, which is exposed to a medium having a relatively low temperature as compared to that of the oil affecting the temperature of said surface, and mechanically operated means for positively engaging and repeatedly removing the layer of oil on said surface and allowing other oil to be deposited in place thereof.

9. In combination, an oil receptacle, said receptacle having an oil engaging surface therein, which is exposed to a medium having a different temperature as compared to the temperature of the oil for affecting the temperature of said surface, and rotary means for repeatedly removing the layer of oil on said surface and allowing other oil to be deposited in place thereof, said means including one or more scraping elements extending in a general, radial direction and having substantial contact with said surface for the purpose of scraping the oil therefrom.

10. In combination, an oil receptacle, said receptacle having an oil engaging surface therein, which is exposed to a medium having a different temperature as compared to the temperature of the oil for affecting the temperature of said surface and rotary means for removing the layer of oil from said surface, said means including one or more scraping elements having an arcuate scraping edge for scraping the oil from the inner surface of said surface and simultaneously causing movement of the oil relative to the element.

11. In combination, an oil receptacle, said receptacle having an oil engaging surface therein, which is exposed to a medium having a different temperature as compared to the temperature of the oil for affecting the temperature of said surface, and a driven element for repeatedly scraping the layer of oil from said surface, said element having apertures for allowing the oil to pass therethrough and be deposited on said surface.

12. In combination, an oil receptacle, said receptacle having an oil engaging surface, which is exposed to a medium having a different temperature, as compared to that of the oil for affecting the temperature of said surface, means for scraping the oil from said surface, and means for positively drawing oil to such surface after each layer of oil is scraped away.

13. In combination, an oil receptacle, said receptacle having a plate portion which constitutes a wall of a receptacle separate of the oil receptacle, means for circulating a fluid having a different temperature from that of the oil through the receptacle, and means for scraping the oil from the oil surface of said plate and allowing other oil to be deposited thereon.

14. In combination, an oil receptacle for a motor, said receptacle having a wall the outer surface of which is provided with heat conducting fins, and means for scraping the oil from the inner surface of said wall and allowing other oil to be deposited in place thereof.

15. In combination, an oil receptacle, said receptacle having a plate portion which constitutes one wall of a water receptacle, means for circulating water through the last receptacle, and means for repeatedly scraping the oil from the oil surface of said plate and allowing other oil to be deposited on said surface.

16. In combination, an oil receptacle for a motor of the air cooled type, said receptacle having a wall, the outer surface of which is provided with heat conducting fins, and mechanically operated means for positively engaging and repeatedly removing the layer of oil from the inner surface of said wall and allowing other oil to be deposited in place thereof.

17. In combination, an oil receptacle, an oil pump in said receptacle, said receptacle having a surface, which is exposed to a medium having a different temperature as compared to that of the oil, for affecting the temperature of the surface, scraping means for repeatedly removing the layer of oil from said surface and allowing other oil to be deposited in place thereof and common means for operating the oil pump and scraping means.

18. In combination, an oil receptacle for a motor, said receptacle having a wall, which is exposed to a medium having a different temperature as compared to that of the oil, an oil pump in said receptacle, and driven means having one or more elements substantially contacting with the inner surface of said wall and adapted to scrape the oil therefrom, said means being driven by the oil pump.

EDWARD F. DICKIESON, Jr.